United States Patent [19]

Arena et al.

[11] Patent Number: 4,963,382
[45] Date of Patent: Oct. 16, 1990

[54] REDUCED CALORIE D-ALDOHEXOSE MONOSACCHARIDES

[75] Inventors: Blaise J. Arena, Des Plaines; Edward C. Arnold, Naperville, both of Ill.

[73] Assignee: Allied-Signal Inc., Morris Township, Morris County, N.J.

[21] Appl. No.: 369,985

[22] Filed: Jun. 22, 1989

[51] Int. Cl.$^5$ .......................... A23L 1/09; A23L 1/307
[52] U.S. Cl. ..................... 426/548; 426/658; 426/804; 426/590; 426/660; 426/577; 426/593; 426/549; 127/30; 127/31; 127/71
[58] Field of Search ............... 426/658, 660, 548, 549, 426/577, 593, 804, 590; 127/31, 30, 71; 532/125, 128

[56] References Cited

U.S. PATENT DOCUMENTS

| 4,262,032 | 4/1981 | Levin | 426/658 |
| 4,581,447 | 5/1986 | Arena | 536/125 |
| 4,786,722 | 11/1988 | Zehner | 536/1.1 |

OTHER PUBLICATIONS

E. Fischer, *Ber. Deutsch. Chem. Ges.*, 23, 370, 382, 389 and 2611 (1890).
M. L. Wolfram and A. Thompson, *J. Am. Chem. Soc.*, 68, 791, 793 (1946).
R. S. Shallenberger, "The Theory of Sweetness", in Sweeteners and Sweetness, pp. 42–50.
R. S. Shallenberg and T. E. Acree in "The Handbook of Sensory Physiology", vol. 4, pp. 241–245 (1971).
E. Schmitz, *Ber. Deutsch. Chem. Ges.*, 46, 2327, 2330 (1913).
E. Fischer and J. Hertz, Ber. Deutsch, Chem. Ges., 25, 1247, 1259 (1892).
E. Fischer and I. Fay, Ibid., 28, 1975 1982 (1895).
E. Fischer and H. Thierfelder, Ibid, 27, 2031 (1894).
Neuberg and Mayer (*Hoppe–Seyler's Zeitschrift f. Phys. Chem.*, 37 530 (1904).
J. Amer. Chem. Soc., 56, 1153 (1934).
W. C. Boyd and S. Matsubara, *Science*, 137, 669 (1962).
R. S. Shallenberg, T. E. Acree and C. Y. Lee, *Nature*, 221, 555, (1969).
Merck Index, 10th Edition, p. 659 (4458).
G. G. Birch and coworkers, *J. Sci. Fd. Agric.*, 21, 650 (1970).
R. S. Shallenberger and coworkers, *J. Food Sci.*, 30, 560 (1965).
"Sugar Chemistry", R. S. Shallenberg and G. G. Birch, p. 1117, The AVI Publishing Company, Inc. (1975).

*Primary Examiner*—Jeanette Hunter
*Attorney, Agent, or Firm*—Eugene I. Snyder; Harold N. Wells; Gerard P. Rooney

[57] ABSTRACT

D-Talose and D-allose are reduced calorie sugars which taste sweet, provide bulk, and undergo the browning reaction. They can be effectively used per se or in combination with intense sweeteners to provide a method of sweetening a broad variety of foods and foodstuffs while providing bulk and body to the product. These materials are especially valuable in baked goods because they closely mimic sucrose in undergoing browning.

24 Claims, No Drawings

REDUCED CALORIE D-ALDOHEXOSE MONOSACCHARIDES

Present dietetic needs, predilections, and perceptions have led to the increased use of artificial sweeteners as a replacement for the "natural" sugars, including sucrose and fructose. Although such artificial sweeteners are under continual review for their long term physiological affects, their demand has grown unabated. Accompanying their growth as a commercial product area with substantial economic impact has been a renewed emphasis on discovering and supplying new artificial sweeteners.

Among its characteristics, the ideal artificial sweetener would be noncaloric, noncariogenic, without detrimental physiological effects, and usable by diabetics. These requirements would be met if a sweetener were not metabolized by humans and by flora which are found in the mouth and intestinal tract, and if it were without effect on any internal organ. The ideal sweetener should be excreted in the same form as when ingested. Another desirable feature is that it have bulking properties similar to sucrose and browning ability so that it can be substituted for table sugar (sucrose) and dextrose in many formulations. Recently, and perhaps belatedly, attention has turned toward the L-sugars as desirable artificial sweeteners. It has been known since at least 1946 that L-fructose is sweet (M. L. Wolfrom and A. Thompson, *J. Am. Chem. Soc.*, 68, 791,793 (1946)), and since at least 1890 that L-fructose is nonfermentable (E. Fischer, *Ber. Deutsch. Chem. Ges.*, 23, 370,389 (1890)), hence not metabolized by microorganisms generally metabolizing D-sugars. A reasonable, although not necessarily correct, inference is that it also is not metabolized by humans. Assuming that L-fructose is sweet and not metabolized it becomes obvious to use it as a noncaloric sweetener in many formulations. More recently Shallenberger and coworkers have demonstrated that many L-sugars have a sweetness comparable to their D-enantiomorphs. *Nature*, 221, 555 (1969). Cf. F. S. Shallenberger, "The Theory of Sweetness," in Sweeteners and Sweetness, pp 42–50, Edited by G. G. Birch and coworkers; R. S. Shallenberger and T. E. Acree in "The Handbook of Sensory Physiology," Vol. 4, pp 241–5, Edited by L. M. Beider (Springer Verlag, 1971). Such teachings are reflected in Levin's suggestion of their use as a sweetening agent; U.S. Pat. No. 4,262,032.

It will be helpful to make a short sojourn through the literature of L-sugars to better appreciate their standing as sweeteners and to serve as a bridge leading to the instant invention. In the context of this application the term "L-sugar" refers to a hexose whose L-enantiomer is not a naturally predominant one. Thus, for example, L-sorbose is outside the scope of L-sugars since it is the predominant enantiomer formed in the fermentation of D-sorbitol, a naturally occurring reduced sugar or hexitol.

The earliest chapters on L-sugars were written by Emil Fischer, who can be truly considered the father of carbohydrate chemistry. In 1890 he observed that L-fructose remained unconverted upon fermenting an aqueous solution of DL-fructose with beer yeast or pressed yeast (E. Fischer, *Ber.*, 23, 370, 389 (1890)). This showed that D-fructose was metabolized by yeast whereas L-fructose was not. Schmitz elaborated upon this work by showing that pressed yeast readily fermented solutions of DL-fructose, and he recovered from the aqueous solution remaining after fermentation L-fructose in 90% yield (E. Schmitz, ibid., 46, 2327, 2330 (1913)).

Concurrent with his preparation of L-fructose Fischer also reported the preparation of L-mannose by selective consumption of D-mannose through yeast fermentation of an aqueous solution of DL-mannose (E. Fischer, ibid., 23, 370, 382 (1890)). Later in that same year Fischer reported the preparation of L-glucose by reduction of L-gluconic acid (idem., ibid., 23, 2611 (1890)). He noted that pure L-glucose was not fermented by beer yeast and, quite significantly, that it tasted quite sweet, a characteristic we return to later.

Shortly thereafter Fischer isolated L-galactose as the residue from yeast fermentation of DL-galactose (E. Fischer and J. Hertz, ibid., 25, 1247, 1259 (1892)), and showed that L-idose was not fermented by yeast (E. Fay, ibid., 28, 1975, 1982 (1895)). In 1894 Fischer published a survey of the fermentability of various sugars using twelve different yeasts (E. Fischer and H. Thierfelder, ibid., 27, 2031 (1894)). Eleven of the yeasts readily fermented D-mannose and D-fructose, and ten of them fermented D-galactose. However, L-mannose was not fermented by any of the twelve yeasts, and L-gulose was not fermented by any of the four yeasts it was tested against.

At the turn of the century Neuberg and Mayer (*Hoppe-Seyler's Zeitschrift f. Phys. Chem.*, 37, 530 (1904)) examined the fate of mannose in rabbit feeding studies. When D-mannose was fed to rabbits none appeared in the urine. However, when L-mannose was fed to rabbits reducing sugars were found in the urine. From the amount of mannose hydrazone isolated from the urine and from its optical rotation, the workers concluded that L-mannose was excreted unchanged in part and converted to L-glucose in part.

From this synopsis of work reported through the first two decades of the 20th Century, one could fairly conclude that L-sugars were not metabolized by a variety of simple organisms (yeasts), and that at least L-mannose was not metabolized in a mammal.

Interestingly, observations on the sweetness of L-sugars lagged considerably observations on their metabolism. Although Fischer reported in 1890 that L-glucose tasted sweet, the next reports issued about a half century later when Austin and Homoller stated that both L-allose and L-altrose are "faintly sweet" (*J. Am. Chem. Soc.*, 56, 1153 (1934)) and Wolfram and Thompson noted that L-fructose tasted very sweet (idem., ibid.). Later L-mannose was reported to be sweet, although the same workers erroneously reported that L-glucose was not sweet at all (W. C. Boyd and S. Matsubara, *Science*, 137, 669 (1962)). The first scientifically designed study of the sweetness of L-sugars appears to be that of R. S. Shallenberger, T. E. Acree and C. Y. Lee, *Nature*, 221, 555 (1969), who compared the relative sweetness of the D- and L-enantiomorphs of several sugars, including L-glucose, L-mannose, and L-galactose. Although differences between the enantiomers were observed, their results showed that the sweetness of the D- and L-enantiomers were comparable. Finally, Levin U.S. Pat. No. 4,262,032 suggested to use L-sugars in sweetened edible formulations where the sweetener is noncalorific and less susceptible to spoilage through growth of microorganisms. The patentee appears to proceed on the assumption, perhaps reasonable at the time but nonetheless unproved, that none of the L-sugars will be metabolized by humans, and also that none will be physiologically or toxicologically detrimental without presenting data which speak to either point.

Their general unavailability initially presented a major obstacle to the use of L-sugars but subsequent work by Arena and coworkers has made L-sugars commercially accessible; U.S. Pat. No. 4,581,447. Perhaps unfortunately, L-sugars have some shortcomings which appear to preclude, or at least to severely limit, their use and the properties indigenous to at least some of the L-hexose sugars make them unattractive for human consumption in the substantial quantities initially envisaged and made available through the accomplishments of the foregoing patentee. The disappointment engendered by the failure of L-hexose sugars to meet their expectations led to our investigating other monosaccharides with quite surprising results, for we have found that both D-talose and D-allose are sweet and not metabolized in rats.

Even though one might have expected the sweetness of the D-hexose monosaccharides to have been thoroughly inventigated previously, this is not the case. Among the aldohexoses D-glucose is of course widely known to be sweet, and D-gulose is reported to be a sweet syrup (Merck Index, 10th Edition, page 659 (4458)). More recently D-galactose has been found to be sweet (Shallenberger and coworkers, *Nature*, 221, 555 (1969)). Although mannose also is reported to be sweet, the situation is somewhat complicated by the fact that its two enantiomers appear to have distinctly different organoleptic properties, with $\beta$-D-mannose actually being bitter: G. G. Birch and coworkers, *J. Sci. Fd. Agric.*, 21, 650 (1970); R. S. Shallenberger and coworkers, *J. Food Sci.*, 30, 560 (1965); "Sugar Chemistry", R. S. Shallenberger and G. G. Birch, page 117, The AVI Publishing Company, Inc., (1975). Even Boyd has noted that D-mannose has a bitter aftertaste (Boyd and Matsubara, op. cit. It should be apparent that a bitter taste is an objectionable organoleptic property in a substance contemplated for use in foods as a sweetener or sweetener replacement. There appears to be no data regarding the organoleptic properties of D-allose, D-altrose, D-idose, and D-talose. Of the ketohexoses the sweet taste of D-fructose is common knowledge, and more recently D-tagatose has been reported to be sweet. See U.S. Pat. No. 4,786,722 and references cited therein.

The metabolism of D-glucose and, to a lesser extent D-galactose, is relatively well studied, but reports on other D-aldohexoses are sparse. Fischer and Thierfelder, op. cit. reported that D-mannose was readily fermented by most, but not all, yeasts they were tested against, but that D-talose was not fermented by any of the twelve. Of the D-ketohexoses the metabolic fate of D-fructose is well documented. Recently the patentee in U.S. Pat. No. 4,786,722 reported that most of D-tagatose given orally to rats was recovered in the feces. However, the lack of detailed experimental data make the qualitative statement of results difficult to evaluate.

A fair conclusion to be drawn from the aforementioned prior art as regards D-talose and D-allose is that their sweetness is open to question, but even if sweet they may have other objectionable or unacceptable organoleptic properties. Whether they are metabolized by mammals cannot be fairly judged by the available data. It is therefore significant that we have found that both D-talose and D-allose are sweet, that neither has any strong objectionable taste characteristics, and that neither is substantially metabolized in rats. Our findings make possible a means to provide reduced calorie sweetening to foods while mimicking other effects of sucrose in foodstuffs, effects to which society has become accustomed through the ages.

The "ideal" reduced-calorie sweetener will have the following characteristics. It should be approximately as sweet, and for convenience at least half as sweet, as sucrose with no other objectionable taste or mouth feel. It should be a bulking sweetener so that it can be substituted for sucrose and dextrose in a wide variety of food formulations without necessitating any large changes in recipes. The sweetener should be metabolized in humans to as small an extent as possible. Also critical in many food applications is the ability of the sweetener to undergo a browning reaction to develop appropriate flavors when heated or baked. Finally, the sweetener should be readily crystallized, since crystallinity often is needed to impart the correct mouth feel to a given foodstuff.

But however desirable the foregoing attributes may be, an abbreviated list is virtually as satisfactory. In particular, a reduced-calorie sugar substitute for non-beverage use need not be sweet. This contradiction is only apparent; if the substitute is a good bulking agent, if it undergoes the browning reaction, if it readily crystallizes, if it is tasteless or devoid of any objectionable tastes, and if it is metabolized only to a minor extent, then the missing quality of sweetness can be readily supplied by any one of several artificial intense, non-sugar sweeteners, and the resulting mixture will have the "ideal" properties given above. Both D-talose and D-allose fulfill the foregoing abbreviated list of desirable attributes; both function well as reduced calorie alternatives to sucrose, especially in combination with intense artificial non-sugars sweeteners.

SUMMARY OF THE INVENTION

The purpose of this invention is to replace caloric sweeteners, especially added sweeteners, in foods and foodstuffs with a reduced calorie D-hexose monosaccharide which has similar bulking properties to those of sucrose and dextrose, which undergoes a browning reaction, which has the same mouth feel in various foods when formulated with sucrose, and which can be readily crystallized. Both D-talose and D-allose have these properties, and their use in foods containing high levels of sugar, especially sugar dispersed within a solid, is particularly useful.

DESCRIPTION OF THE INVENTION

Our invention is a method of lowering the caloric content of foods or foodstuffs while retaining sweetness by replacing a caloric sweetener with a reduced calorie D-aldohexose monosaccharide, i.e., a D-aldose sugar, in combination with, where necessary or desirable, an artificial sweetener with intense sweetening properties. The method of our invention is best employed in non-beverage applications where the bulking properties of D-talose and D-allose will be effective, and has even greater advantages in baked goods where both bulking properties and the ability of our food additives to undergo the browning reaction are fully utilized. As will be discussed, D-talose and/or D-allose may be used alone or in combination with other sweeteners, depending upon the application, and its versatility only adds to their value as additives.

One significant measurement of sweeteners is the sweetness-to-mass ratio. Bulk sweeteners have a sweetness-to-mass ratio similar to that of sucrose and provide body or structure to the products in which they are incorporated. Bulking agents generally are food additives which give body or structure to foods. Intense sweeteners have a significantly greater sweetness-to-mass ratio than sucrose, and consequently add little body or structure to foods. Intense sweeteners are used alone most often in soft drinks where bulking is immaterial, but also can be used with bulking agents not themselves sweet to afford a sweetener mix.

Bulking agents have a number of useful functional properties. They may provide "body", increase viscosity, and may influence the appearance of products into which they are incorporated by becoming an essential part of the structure as crystals, glass, syrup or combined with other components, e.g., lipids or proteins. Bulking food additives also may provide structure without sweeteners, may provide sufficient osmotic pressure to give microbial stability, may provide humectancy, may provide a carrier system for other flavors, will depress freezing points, and are easily weighed in the dry form. These characteristics explain why there remains a need for bulking agents which are sweet per se or which can be used as a mix with intense sweeteners.

The browning reaction (Maillard reaction) is the reaction between the carbonyl group of aldose sugars with the amino groups of amino acids, peptides, and proteins to produce the browning characteristic of baked and fried products. The browning reaction often lends a distinctive visual appearance to foods and frequently also imparts distinctive organoleptic notes to which society has become accustomed through long usage. Intense sweeteners do not undergo the browning reaction generally because they lack the necessary kind of carbonyl group, but since they are used in relatively small amounts even the presence of a reactive carbonyl group would lead to a different browning intensity. Being aldoses, both D-talose and D-allose undergo the browning reaction.

METABOLIC STUDIES

Experimental Protocol: Intravenous Testing. Single-dose intravenous testing was performed in male rats using D-glucose as a control.

Sixteen male rats (Charles River CD strain) at least 10 weeks old and weighing 300–400 g were used as a pool from which 12 were selected for study. All animals were quarantined for an acclimation period of at least 1 week prior to selection of the test pool. Animals were housed in temperature and humidity controlled rooms illuminated with fluorescent lighting 12 hours per day and supplied with food and water ad libitum. Prior to dose administration, each test animal was allowed to adapt to its Roth glass metabolism cage for 3 days. Test animals were fasted for 12 hours prior to dose administration.

Each test animal received a single intravenous injection into the caudal vein of a $^{14}C$ labeled sugar dissolved in sterile water at a dosage of 0.3 grams sugar per kilogram body weight and containing 10 microCuries of label per dose. Sugars were diluted such that the injection volume was 1.0 cc per kilogram of rat body weight. Access to food was denied until 6 hours after dose administration, but during the remaining duration of the test access to food and water was ad libitum. Test animals were maintained in the metabolism cages until the total radioactivity recovered in a given collection period was less than 1% of the initial dose, which occurred within 72 hours. During the test period animals were visually observed at least twice a day with no unusual health or behavior symptoms being noticed.

Expired air was passed through a 5 molar ethanolamine solution in methoxyethanol for trapping volatiles and carbon dioxide and sampled at 6, 12, 24, 48, 72 and 96 hours after dosing. Urine samples were collected and volumes determined at 6, 12, and 24 hours and daily thereafter until the study was terminated. At the end of the test period, metabolism cages were rinsed with water followed by an acetone rinse and the $^{14}C$ label measured in the rinses. All analyses were done in duplicate by liquid scintillation counting performed on aliquots of either the trapped expired air samples or fresh urine from individual animals.

TABLE 1

| Average 72 Hour $^{14}C$ Radiolabel Recovery (% of Administered Dose) | | | |
|---|---|---|---|
| | D-Glucose | D-Allose | D-Talose |
| $CO_2$ (% of dose) | 72.84 | 2.15 | 1.48 |
| Urine (% of dose) | 2.33 | 92.28 | 91.03 |
| Terminal Cage Wash (%) | 0.02 | 0.10 | 0.02 |
| Total Recovery (% of dose) | 75.18 | 94.52 | 92.53 |

TABLE 2

| Normalized Distribution of Recovered $^{14}C$ Radiolabel | | | |
|---|---|---|---|
| | D-Glucose | D-Allose | D-Talose |
| $CO_2$ (% of recovered) | 96.9 | 2.3 | 1.6 |
| Urine (% of recovered) | 3.1 | 97.7 | 98.4 |

Experimental Protocol: Oral Testing. Oral testing was conducted with four rats per test group in three groups. The twelve rats were housed in two banks of metabolism chambers, each bank containing six chambers sharing a common air system. Each animal received a single dose of sugar at a level of 0.3 gram test sugar per kg body weight containing 10 microCuries of $^{14}C$-labeled test sugar. Analyses were performed as previously described over either a 72 or 96 hour period with the results summarized in Table 3.

TABLE 3

| $^{14}C$ Radiolabel Recovery (Percent of Administered Dose), Oral Rat Feeding Study | | | |
|---|---|---|---|
| | D-Glucose | D-Allose | D-Talose |
| Expired $CO_2$ | 71.6 | 3.0 | 11.4 |
| Urine & cage rinse | 2.7 | 85.1 | 16.8 |
| Feces | 1.8 | 1.2 | 65.9 |
| Terminal Cage Wash | 0.1 | 0.9 | 0.6 |

The elimination of the $^{14}C$ labeled D-glucose showed the expected distribution. About 70% showed up in the expired $CO_2$ and about 2–3% was eliminated in the urine. Little, if any, radiolabel is expected in the feces. The bulk of the unrecovered D-glucose (approx. 25%) should be tied up in normal D-glucose metabolic pathways and would be expected to be eliminated slowly over time as a variety of metabolites.

The elimination of the radiolabeled D-allose in expired $CO_2$ was about 3–4%. The majority of the labeled D-allose (approx. 90%) was eliminated in the urine. Again, little radiolabel is expected to be present in the feces of the rats dosed with D-allose. These results indicate that D-allose is well absorbed through the rat's small intestine with the low recovery of radiolabel in the expired $CO_2$ suggesting that D-allose is not metabolized to any appreciable extent, i.e., is non-caloric.

D-Talose showed a significantly different elimination pattern than either D-glucose or D-allose. Upon oral administration, D-talose showed 14-20% elimination in the urine, suggesting poor absorption through the small intestine. Variable amounts (3-19%) of the radiolabel were detected in the expired $CO_2$. This amount of volatile radiolabel detected in the $CO_2$ can most likely be attributed to microbial degradation in the large intestine to produce radiolabeled fatty acids which were then absorbed and metabolized by the rats.

The differing physiological properties of D-allose and D-talose are noteworthy. Although neither is significantly metabolized upon intravenous administration, D-talose does enter the metabolic pathway to a somewhat greater, but nonetheless quite minor, degree upon oral administration. This probably arises from the major difference in the degree of transport across the intestines manifested by these sugars; the major amount of D-allose appearing in the urine suggests its virtually complete absorption in the intestine, whereas the minor amount of D-talose in the urine suggests a low intestinal absorption. If D-talose accumulates in the large intestine and can be metabolized by intestinal flora to afford metabolites which are absorbed this opens a secondary metabolic pathway by which radiolabel ultimately appears as $CO_2$.

The situation which appears to be characteristic of D-talose is reminiscent of that reported for D-tagatose; see U.S. Pat. No. 4,786,722. To the extent that the intestinal transport in the rat is the same as that in humans, the behavioral differences between D-allose and D-talose may be advantageously utilized. Where one desires material not directly absorbed in the intestine one would employ D-talose, and where one desires absorption one would employ D-allose.

TASTE TESTING

Experimental Protocol. Sugar solutions were stored on ice for 50 hours followed by room temperature storage for 16 hours prior to taste testing. α-D-talose, sucrose, D-glucose, D-galactose, and D-mannose all were purchased from Sigma Chemical Company and all were of at least 98.8% purity as determined by liquid chromatography. Sugars were weighed to an accuracy of 0.001 grams and were dissolved in spring water purchased at a local supermarket with resulting solutions bottled in new glassware rinsed with potable water prior to use. Sucrose reference solutions were prepared at a concentration of 0 to 10 weight percent in 1 weight percent increments and as a 6.5 weight percent solution. Solutions of each of talose, glucose, galactose, and mannose were at 10 weight percent.

The taste testing procedure consisted of the following. The subject swirled a 2 mL sample of the test sugar solution in the mouth and over the tongue, the sample was expectorated, and the subject rinsed his or her mouth well with spring water and expectorated the rinse. The foregoing steps were then repeated with 2 mL of a sucrose standard solution. The foregoing cycle was repeated up to five times to match the sweetness of the unknown to the equivalent sucrose standard. Table 4 shows the sweetness index of the sucrose standards and various test sugars which were tasted. Table 5 gives the test sugar sweetness scores. The first number gives the results using all the scores; the number in parenthesis results from dropping the high and low score for each test sugar prior to computing the averages and standard deviations. Results are reported in the following table.

TABLE 4
Standard and Test Sugar Concentrations

| Sucrose Standard | w/w % | Sweetness Index |
|---|---|---|
| | 0 | 0 |
| | 1 | 10 |
| | 2 | 20 |
| | 3 | 30 |
| | 4 | 40 |
| | 5 | 50 |
| | 6 | 60 |
| | 7 | 70 |
| | 8 | 80 |
| | 9 | 90 |
| | 10 | 100 |

| Test Sugars | w/w % | Literature Sweetness Index |
|---|---|---|
| Sucrose | 6.5 | 65 |
| D-Glucose | 10 | 70 |
| D-Galactose | 10 | 30-50 |
| D-Mannose | 10 | 40-60 |
| D-Talose | 10 | unknown |

TABLE 5
Test Sweetness Scores - D-Talose
Sweetness Index

| Sugar | Range | Average | Standard Deviation |
|---|---|---|---|
| Sucrose | 60-75 | 68 (68) | 5.2 |
| D-glucose | 50-75 | 60 (59) | 10.5 |
| D-galactose | 35-85 | 52 (52) | 10.8 |
| D-mannose | 25-80 | 48 (45) | 20.7 |
| D-talose | 40-80 | 57 (55) | 13.3 |

All the test subjects reported a bitter or medicinal taste for D-mannose. Some of the subjects reported a slightly bitter taste for D-talose. In general, taste panel results agreed well with reported values. The sweetness index of D-talose is quite similar to that of D-glucose.

D-allose was sampled by another panel in a test run similarly to that above, except that a 7 percent sucrose solution was used as the standard. Results, given in Table 6, show that the sweetness of D-allose also is comparable to that of D-glucose.

TABLE 6
Test Sweetness Scores - D-Allose
Sweetness Index

| Sugar | Range | Average | Standard Deviation |
|---|---|---|---|
| Sucrose | 55-75 | 69 (71) | 8.0 |
| D-glucose | 50-70 | 62 (63) | 6.8 |
| D-galactose | 45-70 | 58 (58) | 10.9 |
| D-mannose | 30-45 | 38 (38) | 5.3 |
| D-allose | 50-70 | 60 (60) | 6.3 |

That D-talose and D-allose are unique among the D-aldose sugars in having virtually no caloric content also is important in their use in dietetic foods. For a foodstuff to be designated as "reduced calorie" it must have ⅓ fewer calories than the "normal" foodstuffs. Since sugars generally, and sucrose in particular, furnish only a part of the available calories, this means that where a caloric sugar is replaced wholly or partially to achieve a "reduced calorie" status the most desirable replacement will have virtually no caloric content. For example, in a typical milk chocolate candy bar sucrose provides approximately ⅓ of all calories. Therefore to achieve a "reduced calorie" status by replacement of sucrose in a candy bar requires that the substitute have essentially zero calories. D-talose and D-allose are unique among the D-aldose sugars in this respect.

Continuing with a chocolate candy bar as an example, the sucrose substitute also needs to provide comparable bulk and to provide similar mouth feel as sucrose itself. In both regards D-talose and D-allose are not merely an adequate replacement but are excellent sucrose mimics. Also necessary in such a use is that the replacement be crystalline to impart the appropriate mouth feel to the candy. Some D-sugars, including D-fructose and D-gulose, are difficult to impossible to crystallize, whereas both D-talose and D-allose are readily crystallized and consequently usable in applications such as candies where crystallinity imparts the necessary and customary "mouth feel" associated with the food.

The foregoing has been directed toward replacement of sucrose, especially added sucrose, as a caloric sweetener by D-talose and/or D-allose. However, in the more general sense any caloric sweetener, or any mixture of caloric sweeteners, can be replaced by D-talose and/or D-allose. The foodstuffs in which such a replacement can be made are virtually unlimited with many illustrated by Table 7. Although total replacement of a caloric sweetener, especially an added caloric sweetener, in a foodstuff by D-talose and/or D-allose, either alone or in combination with one or more intense sweeteners, is envisaged as its most prevalent usage, partial replacement of a caloric sweetener by them also may be practiced, although generally such a substitution is a less desired one.

TABLE 7

Amount of Sugars in Average Serving Portion of Foods[a,b]

| Food | Average Portion | Grams Sugar |
|---|---|---|
| Cola Soda | 12 fl. oz. | 40.7 |
| Ginger Ale | 12 fl. oz. | 29.0 |
| Orange Soda | 12 fl. oz. | 45.8 |
| Tonic Water | 4 fl. oz. | 10.4 |
| Kool-aid from mix | 8 fl. oz. | 24.2 |
| Lemonade, form frzn. conc. | 8 fl. oz. | 23.1 |
| Tang, orange | 3 rd. t in 6 fl. oz. water | 21.7 |
| Choc. chips, semi-sweet | 1 oz. | 17.0 |
| Choc. german sweet | 1 oz. | 8.3 |
| Milk choc. | 1.65 oz. bar | 25.0 |
| Peanut butter cup | 1.6 oz. | 21.0 |
| Bran flakes | ¾ cup | 5.0 |
| Buc wheats | ¾ cup | 9.0 |
| Crispy wheats & raisins | ¾ cup | 10.0 |
| Froot loops | 1 cup | 13.0 |
| Granola | ⅓ cup | 7.0 |
| Kix | 1½ cups | 2.0 |
| Lucky Charms | 1 cup | 11.0 |
| Rice Krispies, frosted | 1 cup | 10.0 |
| Sugar Smacks | ¾ cup | 16.0 |
| Cheesecake, from mix | ⅙ cake | 29.3 |
| Pie filling | | |
| Coconut cream, from mix | 1/6 pie | 13.1 |
| Lemon w/meringue, from mix | 1/6 pie | 31.3 |
| Pudding | ½ cup | 23–26 |
| Choc. syrup | 1 tablespoon | 9.9 |
| Cocoa mix | 1 oz. | 20.0 |
| Coconut, dried, shredded, sweetened | ⅓ cup | 10.3 |
| Pancake/waffle syrup | 1 fl. oz. | 20–25 |

[a]Taken from "Food Values of Portions Commonly Used," 14th Ed., J. A. T. Pennington and H. N. Church, Harper & Row, New York (1985), pp 236–239.
[b]Includes all added and naturally occurring mono- and disaccharides.

There does not appear to be any significant limitations as to the kind of food or foodstuff in which D-talose or D-allose may be used as a low calorie sweetener. Some of such foods and foodstuffs are listed in Table 5, which is meant to be merely an illustrative and non exhaustive compendium of typical products. Our invention may be particularly useful in chocolate, in jams, jellies, and preserves, in baked goods such as cookies and cakes, and as a table top sweetener itself. But it needs to be emphasized again that these are merely some of the many edible formulations where our invention may be employed.

There is no limit on the kind of caloric sweetener which D-talose and/or D-allose may replace. Sucrose is by far the most common and most important example of such a caloric sweetener. However, other oligosaccharides, disaccharides, monosaccharides, and sugar alcohols generally when used as caloric sweeteners may be replaced by D-talose or D-allose. Such sweeteners include glucose, sorbose, fructose, maltose, lactose, sorbitol, xylitol, polysaccharides containing glucose subunits, and corn syrups.

Upon careful consideration it will become apparent that there is a plethora of ways in which D-talose and/or D-allose may be used as a sweetener, all of which are intended to be encompassed by our invention. Although a discussion and description of each mode is too cumbersome and lengthy to be practical, one other mode deserves particular attention. Specifically, D-talose and/or D-allose can be used in an amount sufficient to provide only partial sweetness replacement of, e.g., sucrose while providing the desired bulking and/or browning properties, with a high intensity sweetener, such as saccharin, stevioside, glycyrrhizin, thaumatin, aspartame, cyclamates, acesulfame-K, sucralose, alitame, or other suitable dipeptides, added to provide the final desired sweetness level. It is to be understood that we explicitly contemplate the use of D-talose and/or D-allose in combination with any other non-caloric sweetener, especially a high intensity non-caloric sweetener, as a replacement, in whole or in part, for caloric sweeteners normally present in a foodstuff.

In summary, this disclosure relates to foodstuffs whose "natural," usually added sweeteners have been replaced, in whole or in part, by non-caloric sweeteners in an amount sufficient to impart about the same sweetness to the resulting foodstuff. D-Talose or D-allose may be the only non-caloric sweetener present, or either (or both) may be present in combination with one or more other non-caloric sweeteners. Because of the desire to achieve reduced calorie status, non-caloric sweeteners generally will be present in foods in an amount sufficient to reduce the caloric contribution of caloric sweeteners by at least 33⅓% and often will totally replace caloric sweeteners. Where D-talose and/or D-allose is only one of the non-caloric sweeteners in a foodstuff, it usually will be present in an amount where it contributes at least 10% of the sweetness level arising from the non-caloric sweeteners, and generally will contribute more than 20% of that sweetness level.

What is claimed is:

1. A reduced-calorie bulking and sweetening agent for edible formulations comprising at least one D-aldohexose selected from the group consisting of D-talose and D-allose.

2. The agent of claim 1 where the D-aldohexose is D-talose.

3. The agent of claim 1 where the D-aldohexose is D-allose.

4. A reduced-calorie bulking and sweetening agent for edible formulations comprising a mixture containing at least one D-aldohexose selected from the group consisting of D-talose and D-allose and at least one artificial non-sugar sweetener.

5. The agent of claim 4 where the D-aldohexose is D-talose.

6. The agent of claim 4 where the D-aldohexose is D-allose.

7. The agent of claim 4 where the artificial non-sugar sweetener is selected from the group consisting of saccharin, stevioside, glycyrrhizin, thaumatin, aspartame, cyclamate, acesulfame-K, sucralose, and alitame.

8. A method of providing reduced-calorie bulking and sweetening to edible formulations comprising adding to said edible formulations at least one D-aldohexose selected from the group consisting of D-talose and D-allose in an amount sufficient to provide the desired level of bulking.

9. The method of claim 8 where the D-aldohexose is D-talose.

10. The method of claim 8 where the D-aldohexose is D-allose.

11. The method of claim 8 where the edible formulations are selected from the group consisting of chocolate, candy, jam, jelly, preserves, baked goods, and beverages.

12. A method of providing browning and reduced-calorie bulking and sweetening to edible formulations comprising adding to said edible formulations at least one D-aldohexose selected from the group consisting of D-talose and D-allose in an amount sufficient to provide the desired level of browning.

13. The method of claim 12 where the D-aldohexose is D-talose.

14. The method of claim 12 where the D-aldohexose is D-allose.

15. The method of claim 12 where the edible formulations are baked goods.

16. A method of providing reduced-calorie bulking and sweetening to edible formulations comprising adding to said edible formulations at least one D-aldohexose selected from the group consisting of D-talose and D-allose in an amount sufficient to provide the desired level of sweetness.

17. The method of claim 16 where the D-aldohexose is D-talose.

18. The method of claim 16 where the D-aldohexose is D-allose.

19. The method of claim 16 where the edible formulations are selected from the group consisting of chocolate, candy, jam, jelly, preserves, baked goods, and beverages.

20. A method of providing reduced-calorie bulking and sweetening to edible formulations comprising adding to said edible formulations a mixture containing at least one D-aldohexose selected from the group consisting of D-talose and D-allose in an amount sufficient to provide the desired level of bulking and at least one non-sugar artificial sweetener in an amount sufficient to provide the desired level of sweetness.

21. The method of claim 20 where the D-aldohexose is D-talose.

22. The method of claim 20 where the D-aldohexose is D-allose.

23. The method of claim 20 where the artificial non-sugar sweetener is selected from the group consisting of saccharin, stevioside, glycyrrhizin, thaumatin, aspartame, cyclamate, acesulfame-K, sucralose, and alitame.

24. The method of claim 20 where the edible formulations are selected from the group consisting of chocolate, candy, jam, jelly, preserves, baked goods, and beverages.

* * * * *